UNITED STATES PATENT OFFICE.

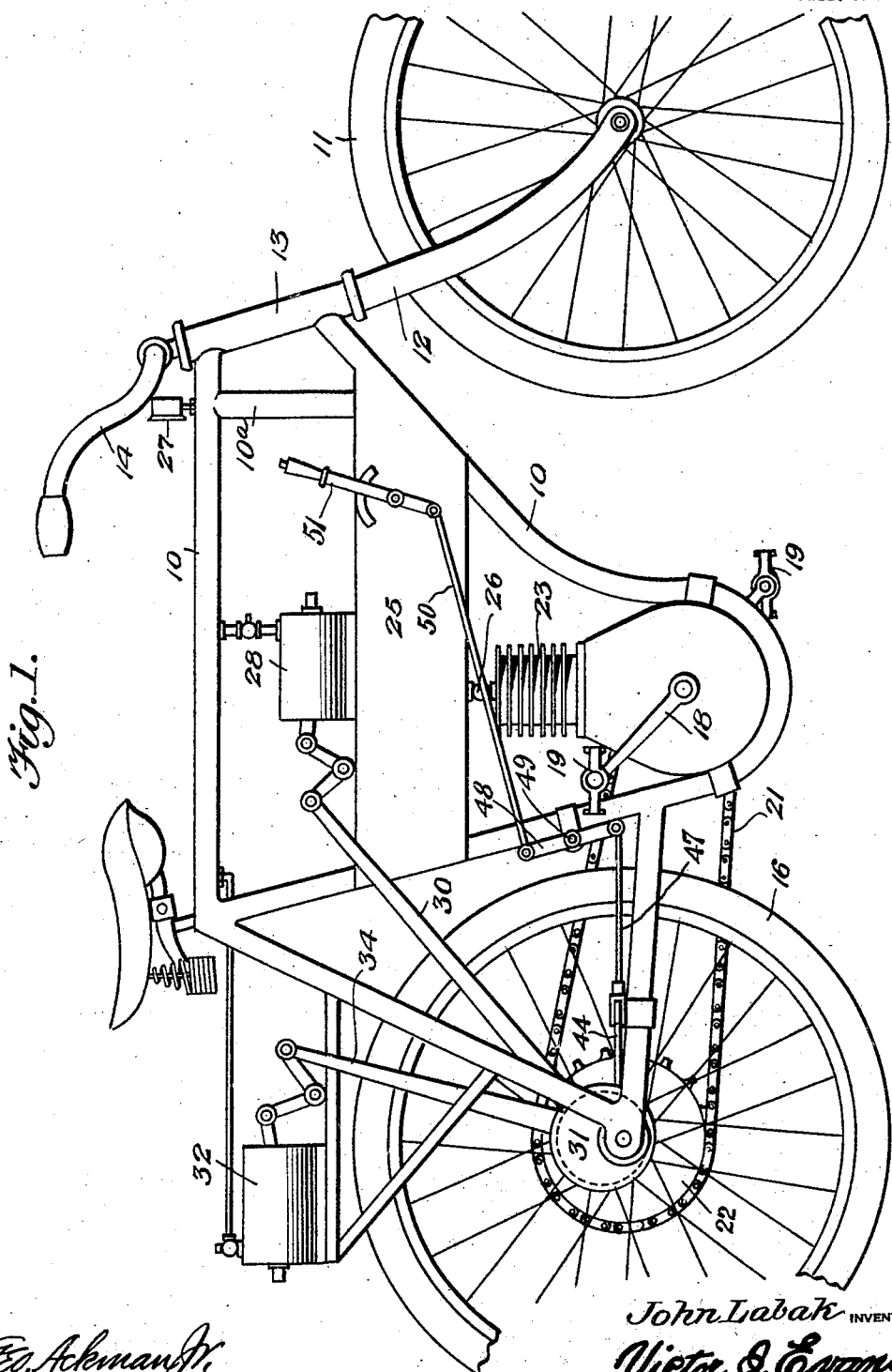

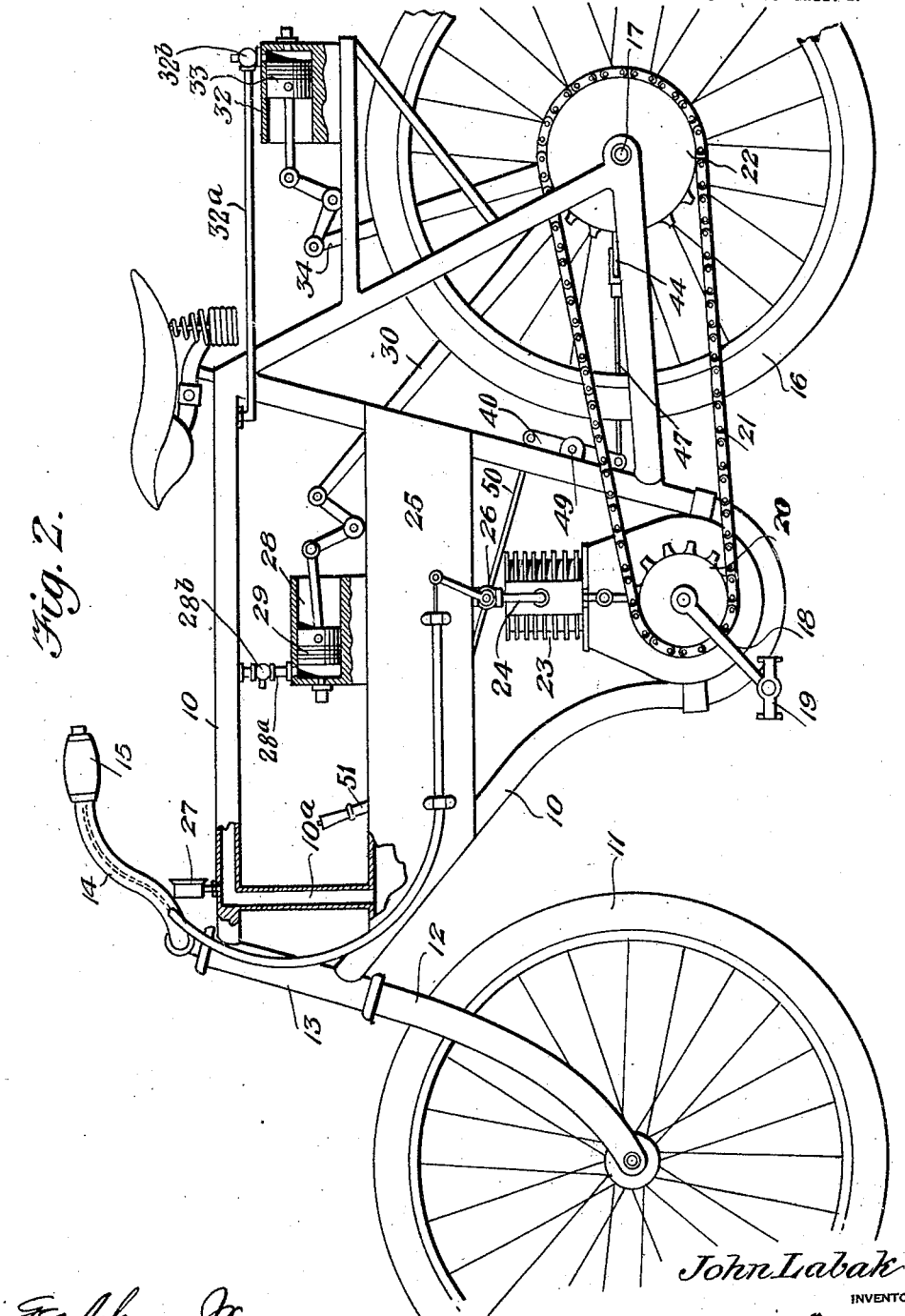

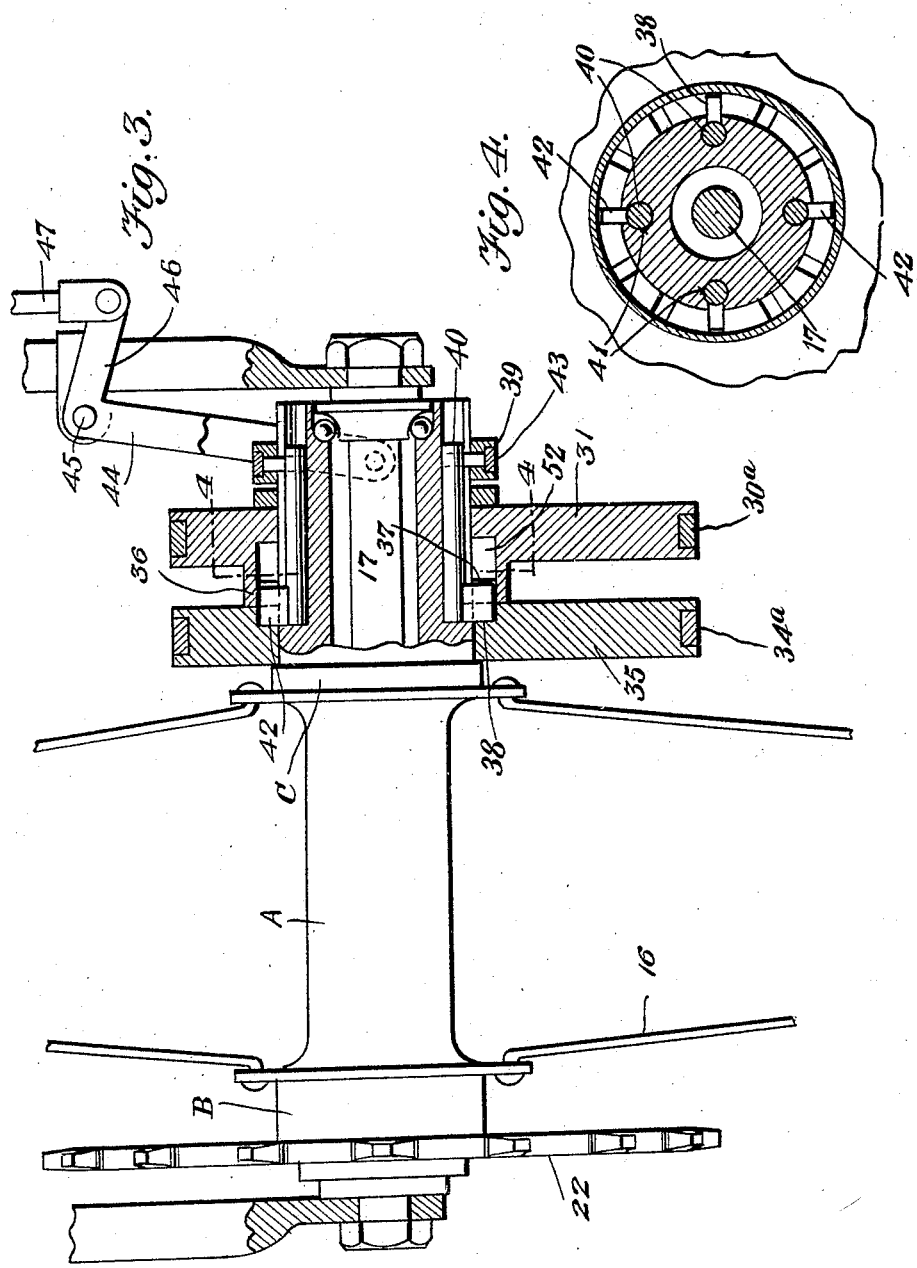

JOHN LABAK, OF CANTON, OHIO.

AIR-MOTOR DEVICE FOR BICYCLES.

1,410,326. Specification of Letters Patent. Patented Mar. 21, 1922.

Application filed August 27, 1920, Serial No. 406,270. Renewed October 3, 1921. Serial No. 505,114.

*To all whom it may concern:*

Be it known that I, JOHN LABAK, a citizen of the United States, residing at Canton, in the county of Stark and State of Ohio, have invented new and useful Improvements in Air-Motor Devices for Bicycles, of which the following is a specification.

This invention relates to bicycles and has for its object the provision of a bicycle equipped with an air motor driven by compressed air stored in a reservoir tank by pumping means actuated during the coasting of the bicycle down hill, the air assisting in the propulsion of the bicycle under normal conditions.

An important object is the provision of a bicycle which is designed to be initially started by pedal means and which has associated with the rear wheel axle a plurality of pumps for compressing air within a storage tank and provided with means whereby either or both pumps may be rendered inoperative, the storage tank being provided with an outlet control valve whereby to control the speed of the air motor, this valve being controlled by a movable grip on the handle bars.

An additional object is the provision of a device of this character which will be comparatively simple and inexpensive in manufacture, highly efficient and labor saving in use, and a general improvement in the art.

With the above and other objects and advantages in view, the invention consists in the details of construction to be hereinafter more fully described and claimed and illustrated in the accompanying drawings in which,—

Figure 1 is a side elevation of a bicycle constructed in accordance with my invention, Figure 2 is a longitudinal sectional view, Figure 3 is a cross sectional view through the rear wheel showing the pump actuating means, and Fig. 4 is a sectional detail view.

Referring more particularly to the drawings, the numeral 10 designates the frame which is of the customary shape and which has its various bars formed hollow. The numeral 11 designates the front wheel carried by the usual fork 12 journaled through the head 13. The fork is controlled by the usual handle bars 14, one of which is provided with a movable grip 15. The numeral 16 designates the rear wheel having an axle 17.

The frame is provided with the usual crank hanger 18 having pedals 19 and equipped with a sprocket 20 about which is trained a chain 21 leading around a sprocket 22 on the rear wheel. The axle of the rear wheel is provided with any of the well known or any preferred type of coaster brake, details of which are believed to be unnecessary.

Located at the bottom portion of the frame is a compressed air motor 23 which has an inlet pipe 24 leading from a compressed air storage tank 25 supporting thereabove and this pipe 24 is provided with a control valve 26 operatively connected with the movable grip 15 whereby the valve may be opened to the desired extent. Located near the handle bars is a suitable air gage 27 which communicates with the uppermost hollow bar of the frame 10 and it will be observed that this hollow bar communicates with the front hollow bar 10$^a$ which in turn communicates with the tank 25.

Mounted below the upper portion of the frame 10 is a pump 28 which has its piston 29 connected by a pitman 30 with an eccentric 31 on the rear axle 17, the pitman carrying an ordinary eccentric strap 30$^a$ engaging within a groove in the eccentric. The pump cylinder 28 communicates with the upper hollow bar 10 of the frame through a pipe 28$^a$ provided with a check valve 28$^b$. Supported at the rear of the frame above the rear wheel is a second air pump 32 which has its piston 33 connected by a pitman 34 with a second eccentric 35 on the rear axle, the pitman carrying an ordinary eccentric strap 34$^a$ engaging with a groove in the eccentric 35.

The rear hub A is provided with any suitable or preferred coaster brake mechanism whereby the sprocket 22 may be held stationary and the machine be allowed to coast. This coaster brake mechanism is not illustrated as it is so well known in the art that it forms no part of the present invention. The letter B designates the end of the rear hub adjacent the sprocket and which serves to partially enclose whatever coaster brake mechanism might be employed.

Both the eccentrics 31 and 35 are loose upon the other end C of the hub and the eccentrics are normally spaced apart by means of a flange 36 extending laterally from the eccentric 31. The end C of the hub is prolonged as shown to form ample bearing for the eccentrics 31 and 35 and so as to extend outwardly beyond the eccentric 31. The eccentric 31 is formed within the flange 36 with a series of notches 37 while the eccentric 35 is similarly provided at its internal periphery with notches 38 adapted to register with the notches 37. The two series of notches or recesses constitute clutch elements as will be hereinafter explained. Slidable upon the outermost portion of the hub at the end C is a grooved collar 39 with which are connected a plurality of rods 40 slidable longitudinally of the hub within grooves 41. The free ends of these rods 41 carry keys 42 which always engage within the notches 37 and which are capable of being likewise engaged within the notches 38. A shifting ring 43 is disposed within the groove of the collar 39 and has connected therewith one arm 44 of an angle lever pivoted at 45 upon one of the rear forks. Connected with the other arm 46 of this angle lever is a rod 47 which extends forwardly and has its forward end pivotally connected with the lower end of a lever 48 pivoted upon the rearmost one of the intermediate frame bars as shown at 49. The upper end of the lever 48 has pivotally connected therewith a forwardly extending rod 50 which is pivotally connected with a shifting lever 51 disposed near the forward frame bar 10$^a$.

In the operation of the device the operator ordinarily pedals the bicycle by means of the pedals 19 in the usual manner which results in actuation of the pumps 28 and 32 and air will be compressed thereby and stored within the tank 25, it being understood that this time the control valve 26 is closed to retain the air within the tank. When the rider comes to a hill which he must ascend he opens the valve 26 whereupon the compressed air will actuate the motor 23 which will drive the rear wheel of the bicycle. If a sufficient quantity of air has been compressed within the storage tank it is possible that the motor will be able to drive the bicycle entirely by itself and if the quantity be insufficient the motor will at least assist in driving the bicycle so that the actual effort on the part of the driver will be minimized. As the rear hub is equipped with an ordinary coaster brake device, it will be apparent that when the rider descends a hill he may hold his feet stationary and the coasting of the bicycle will of course result in actuation of the pump and storage of compressed air within the tank.

It should be stated that the eccentric 31 is formed at the innermost portion of its inner periphery with an annular channel 52 which leads into the notches 37. The purpose of this construction is as follows:— When the operator shifts the lever 51 and consequently moves the angle levers 44 and 46 and shifts the collar 39 to move the rod 40 in one direction the keys 42 will engage only within the notches 38 of the cam or eccentric 35. It is apparent that the eccentric 35 is the only one which will then be driven and this will of course result in operation of the associated pump. In case the operator should shift the lever 51 and thereby moves the rod 40 to bring the keys 42 into the notches 38 and 37 both the eccentrics 35 and 31 will be driven for operating both of the air compressing pumps. If the operator moves the lever 51 and consequently the rods 40 to bring the keys 42 into the annular passage 52 then neither of the eccentrics will be operated and the device may be pedaled in the ordinary manner without any more difficulty than any other bicycle. Owing to the peculiar construction of this mechanism on the rear axle it is apparent that the coaster brake mechanism might be dispensed with so that it is preferable to have it included.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A motor bicycle comprising a frame supported upon forward and rear wheels, a crank journaled at the lower portion of the frame and having pedals and operatively connected with the rear wheel whereby to drive the latter, a compressed air motor supported by the frame and connected with the crank, a compressed air storage tank supported by the frame and having a valved outlet pipe leading to said motor, a pump carried by the frame, an eccentric on the rear axle and driven thereby, and a pitman connected with said eccentric and with the piston of said pump.

2. A motor bicycle comprising a frame supported upon forward and rear wheels, a crank journaled at the lower portion of the frame and having pedals and operatively connected with the rear wheel whereby to drive the latter, a compressed air motor supported by the frame and connected with the crank, a compressed air storage tank supported by the frame and having a valved outlet pipe leading to said motor, a pair of pumps carried by the frame, a pair of eccentrics on the rear axle and driven thereby, pitmen connected with said eccentrics and with the pistons of said pumps, said pumps having outlet pipes leading to said tank, and means for locking or unlocking said eccentrics with respect to the rear axle whereby either or both may be rendered operative or inoperative.

In testimony whereof I affix my signature.

JOHN LABAK.